United States Patent [19]

Parfondry et al.

[11] Patent Number: 5,071,881
[45] Date of Patent: Dec. 10, 1991

[54] $CO_2$ BLOWN INTEGRAL SKIN FOAMS

[75] Inventors: Alain Parfondry, Evere; Jan W. Leenslag, Neerijse, both of Belgium

[73] Assignee: Imperial Chemical Industries PLC, London, England

[21] Appl. No.: 526,845

[22] Filed: May 22, 1990

[30] Foreign Application Priority Data

May 23, 1989 [GB] United Kingdom ................. 8911853

[51] Int. Cl.$^5$ ............................................. C08G 18/14
[52] U.S. Cl. ....................................... 521/51; 121/128; 521/137; 528/28; 528/58; 528/68; 528/75; 528/76
[58] Field of Search ...................... 526/51; 528/28, 68, 528/75, 76, 58; 521/51, 128, 137

[56] References Cited

U.S. PATENT DOCUMENTS

| | | | |
|---|---|---|---|
| 3,226,368 | 12/1965 | Resichl et al. | 528/51 |
| 4,234,694 | 11/1980 | La Spina et al. | 521/107 |
| 4,352,896 | 10/1982 | Kopp et al. | 521/118 |
| 4,377,644 | 3/1983 | Kopp et al. | 521/94 |
| 4,559,366 | 12/1985 | Hostettler | 521/51 |
| 4,560,708 | 12/1985 | Horn et al. | 521/137 |
| 4,906,720 | 3/1990 | Parfondry | 528/28 |

OTHER PUBLICATIONS

Ulrich et al., Journal of Cellular Plastics, vol. 21, No. 5, pp. 350-357 (Sep./Oct. 1985).

*Primary Examiner*—John Kight, III
*Assistant Examiner*—Du Truong
*Attorney, Agent, or Firm*—Cushman, Darby & Cushman

[57] ABSTRACT

A process for making integral skin foams which comprises reacting into a closed mould:
  A) an organic polyisocyanate
  B) an isocyanate-reactive composition comprising:
    (i) a catalytically effective amount of a urethane-promoting catalyst and optionally a urea-promoting catalyst,
    (ii) a catalytically effective amount of a carbodiimide-promoting catalyst, and
    (iii) an isocyanate-reactive compound; in the presence of
  C) an inert physical blowing agent.

The process provides integral skin foams having good skin properties at reduced physical blowing agent levels.

13 Claims, No Drawings

CO₂ BLOWN INTEGRAL SKIN FOAMS

This invention relates to the preparation of self-skinning or integral skin foams. In particular, the invention relates to the preparation of polyurethane and/or polyurea-polyurethane integral skin foams.

In the manufacture of self-skinning (integral skin) moulded parts, the use of halohydrocarbons—in particular of chlorofluoro carbons, the so-called CFC's—as physical non reactive blowing agent seems inevitable. This is due to their unique contribution to the formation of the outer skin of the skinned parts. However, the environmental problems encountered with the CFC's call for less harmful alternatives. A partial or complete replacement of the CFC's by $H_2O$—which generates $CO_2$ upon reaction with the isocyanate could be a straightforward solution. Unfortunately, the use of $H_2O$ as blowing agent leads to integral skin foams having generally poor skin properties.

It has now been found surprisingly that integral skin parts having good skin properties can be obtained with partial replacement of the CFC by $CO_2$, when the carbon dioxide is generated upon formation of carbodiimide linkages during the foaming process.

It has already been proposed to prepare rigid foams containing both carbodiimide and isocyanurate groups by polymerising an organic polyisocyanate in the presence of a blowing agent, a catalyst which promotes the formation of carbodiimide groups and a catalyst which promotes the formation of isocyanurate groups.

Representative of such teachings are patent publications GB 1234946, GB 1461203, U.S. Pat. No. 4166164. GB 1234946 relates to carbodiimide/isocyanurate rigid foams obtained by mixing polyisocyanate with a catalyst composition comprising a carbodiimide promoting catalyst and an isocyanurate promoting catalyst—in the absence of any "polyol" component.

The foams are used as insulation material.

U.S. Pat. No. 4166164 similarly relates to isocyanurate-carbodiimide foams obtained by using a combination of a catalyst for the formation of carbodiimide linkages and a catalyst for the formation of isocyanurate linkages. The resulting foams are rigid cellular products for insulation.

GB 1461203 relates to the manufacture of rigid foams having carbodiimide, isocyanurate and urethane linkages, by reacting an isocyanate and a "polyol" component in the presence of a catalyst mixture comprising:

a) a catalyst for the formation of urethane linkages b) a co-catalyst promoting the formation of both isocyanurate and carbodiimide linkages.

The resulting products are rigid cellular products for insulation.

It has now been found that $CO_2$ generated by a catalyst promoting the formation of carbodiimide linkages can be used as partial blowing agent—in an admixture with reduced amounts of halohydrocarbons—in the preparation of self-skinning foams of any type: flexible, rigid, semi-rigid or elastomeric. The resulting foams show very good skin properties and reduced core densities as compared with corresponding self-skinning foams obtained by using halohydrocarbons as only blowing agent.

Accordingly the present invention provides a process for making integral skin foams which comprises reacting into a closed mould:

A) an organic polyisocyanate

B) an isocyanate-reactive composition comprising:
   (i) a catalytically effective amount of a urethane-promoting catalyst and optionally a urea-promoting catalyst,
   (ii) a catalytically effective amount of a carbodiimide-promoting catalyst,
   (iii) an isocyanate-reactive compound; in the presence of C) an inert physical blowing agent.

Organic polyisocyanates or polyisocyanate compositions which may be used according the the present invention may include any of the aliphatic, cycloaliphatic, araliphatic or aromatic polyisocyanates known in polyurethane or polyurea chemistry, especially those that are liquid at room temperature.

Examples of suitable polyisocyanates include ethylene diisocyanate, 1,6-hexamethylene diisocyanate, isophorone diisocyanate, cyclohexane-1,4-diisocyanate, 4,4-dicyclohexylmethane diisocyanate, 1,4-xylylene diisocyanate, 1,4-phenylene diisocyanate, 2,4-toluene diisocyanate, 2,6-toluene diisocyanate, 4,4'-diphenylmethane diisocyanate, 2,4-diphenylmethane diisocyanate, polymethylene polyphenylene polyisocyanates (crude MDI) and 1,5-napthylene diisocyanate. Mixtures of polyisocyanates can be used and also polyisocyanates which have bee modified by the introduction of urethane, allophanate, urea, biuret, carbodiimide, uretonimine or isocyanurate residues.

In general, the aromatic polyisocyanates are preferred, especially the available MDI isomers, that is to say 4,4'-diphenylmethane diisocyanate, 2,4'-diphenylmethane diisocyanate and mixtures thereof. MDI variants such as uretonimine-modified MDI and MDI prepolymers are also of great value in the moulding process.

Suitable urethane-promoting catalysts to be used in the reaction system of the present invention are well known in the art.

Examples of suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, or a mixture thereof.

Tertiary amine catalysts include trialkylamines such as for example, trimethylamine, triethylamine; heterocyclic amines such as N-alkylmorpholines, for example, N-methylmorpholine, N-ethylmorpholine; 2,2'-bis(dimethylamino)diethyl ether; 1,4-dimethylpiperazine, triethylenediamine, and aliphatic polyamines such as N,N,N',N'tetramethyl-1,3-butanediamine or N-methyl diethanolamine. The amount of catalyst used is at most 5% by weight of the total isocyanate-reactive composition, preferably less than 1%. Combinations of tertiary amine and organotin catalysts are frequently used in the art.

Optionally, where needed, a catalyst for the isocyanate-amine reaction can also be included in the reaction system of the present invention. Examples of those more specific catalysts include carboxylic acids, and precursors thereof (such as acid anhydrides). Specific examples of carboxylic acid catalysts include oleic acid, 1,12-dodecanedioic acid, isophthalic acid, etc. These types of catalysts are described in U.S. Pat. Nos. 4,499,254; 4,487,908; and 4,487,912.

When used, their amounts should not exceed 5% by weight of total isocyanate-reactive composition.

It is also within the scope of the present invention to use the above urethane-promoting or urea-promoting catalyst(s) in the isocyanate composition or as a separate stream.

Suitable carbodiimide-promoting catalyst to be used in the reaction system of the present invention are those catalysts which are sufficiently reactive within the exotherm profile of the reaction mixture.

Suitable catalysts have already been described: see e.g. U.S. Pat. No. 4,743,626 which is included herein by reference. Preferred catalysts are phospholene oxide compounds of following formula—or their salts—:

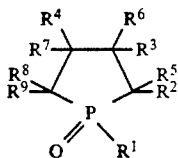

wherein
$R^1$ is substituted or unsubstituted hydrocarbyl group,
$R^2$ or $R^4$ is Cl or alkyl of 1 to 12 C, while the other group out of $R^2$ and $R^4$ forms a double bond with $R^3$, and
$R^5$ to $R^9$ are H, Cl or alkyl of 1 to 12 C.

Suitable compounds (generally referred to as phospholene oxide or oxo phospholene compounds) include those for which $R^1$ is methyl, ethyl, propyl, isopropyl, n-butyl, tert-butyl, cyclohexyl, n-dodecyl, phenyl, o-, m- or p-tolyl, xylyl, naphthyl, 4-diphenyl, 2-phenylethyl, 2-chloroethyl, 2-methoxyethyl, o-, m- or p-chlorophenyl, p-methoxyphenyl and p-N, N-dimethylaminophenyl. Preferably, $R^1$ is alkyl of 1 to 4 C, phenyl or benzyl. The group out of $R^2$ or $R^4$ which does not form a double bond with $R^3$ preferably is H.

As examples of $R^2$ to $R^9$, which may be the same or may be different, there may be mentioned hydrogen, chlorine, methyl, ethyl, propyl, isopropyl and butyl, a preferred lower alkyl group is methyl. Preferably $R^5$ to $R^9$ is H or methyl.

Specific examples of phospholene oxide catalysts which may be used in the present process include:
1-methyl-1-oxo-phospholene
1-ethyl-1-oxo-phospholene
1-phenyl-3-methyl-1-oxo-phospholene
1-benzyl-3-methyl-1-oxo-phospholene
1-ethyl-3-methyl-1-oxo-phospholene Preferred catalysts are 1-methyl-1-oxo-phospholene, 1-ethyl-1-oxo-phospholene and 1-phenyl-3-methyl-1-oxophospholene or mixtures thereof.

Amounts of carbodiimide-promoting catalyst to be used in the reaction system of the present invention should not exceed 5% by weight of total isocyanate-reactive composition.

Suitable isocyanate-reactive compounds of the reaction system of the present invention include polyols, polyamines, imino-functional compounds, enamine-containing compounds and mixtures thereof.

As example of suitable polyols there may be mentioned polyesters, polyesteramides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other particularly useful polyether polyols include polytetramethylen glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxyethyl)-terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals. Suitable polyolefin polyols include hydroxy-terminated butadiene homo- and copolymers and suitable polysiloxane polyols include polydimethylsiloxane diols and triols. Other polyols which may be used comprise dispersions or solutions of addition or condensation polymers in polyols of the types described above. Such modified polyols have been fully described in the prior art and include products obtained by the in situ polymerisation of one or more vinyl monomers, for example styrene and acrylonitrile, in polymeric polyols, for example polyether polyols or by the in situ reaction between a polyisocyanate and an amino-functional and/or alkanol amine or hydroxy-functional compound in a polymeric polyol.

Polyamines having molecular weights of at least 1000 include amino-terminated polythioethers, polyesters, polyesteramides, polycarbonates, polyacetals, polyolefins, polysiloxanes and especially, polyethers. Polyether polyamines which may be used include products obtained by the reductive amination of polyether polyols as described, for example, in U.S. Pat. No. 3,654,370, or by the cyanoethylation of polyols followed by hydrogenation. Polyoxypropylene and poly(oxyethylene-oxypropylene)diamines and triamines and mixtures thereof are preferred.

Also useful are polymers containing both amino and hydroxyl groups obtained by the partial amination of polyols.

Imino-functional compounds which may be used are iminofunctional compounds capable of reacting directly with polyisocyanates without prior cleavage of the C=N bond to form a monomeric byproduct. Suitable imino-functional compounds include imino-functional polyether resins.

"Imino-functional" as used herein means that a reactant contains the grouping:

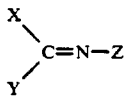

wherein X, Y and Z are chemical moieties which collectively form the rest of said compound and are each independently selected from hydrogen and organic radicals which radicals are attached to the imino unit:

of said compound through N, C, O, S, Si or P, the central carbon atom of said imino unit being bonded to three atoms.

In the above structure, neither the carbon nor the nitrogen atom of the imino unit should be incorporated within an aromatic or other fully conjugated ring or ring system. It is preferred that is attached to the imino unit through saturated atoms, preferably aliphatic carbon atoms.

The range of imino-functional reagents which may be used in the invention is not limited by or to any particular chemistry of the preparation of said reagents. For example, imine terminated aliphatic polyethers may be made by a number of different routes Specifically, the amine groups (—NH$_2$) of an aliphatic amine-terminated polyether can be prereacted with an aldehyde (XCH$_2$CHO) or a ketone (X—CO—Y), to form, respectively, or the corresponding aldimine

—N=CHCH$_2$X or the corresponding ketimine

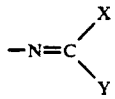

or the aldehyde and/or ketone group of an aldehyde and/or ketone-terminated polyether, can be prereacted with an aliphatic primary mono-amine to form, respectively, the corresponding aldimine and/or ketimine-terminated polyethers:

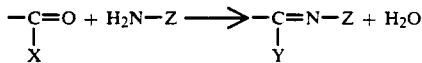

The preparation of imino functional groups in both cyclic and acyclic forms is well known in the literature, such as from "The Chemistry of the Carbon-Nitrogen Double Bond", Ed. S. Patai, Interscience Publishers, London, 1970 and references therein.

Enamine-containing compounds which may be present include compounds having the structures:

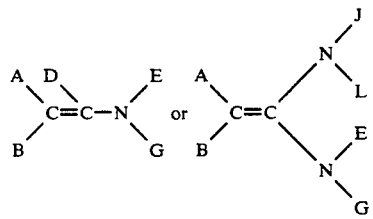

wherein each of A, B, D, E, G, J and L, independently, represents hydrogen or, preferably, an optionally substituted hydrocarbon radical, any of A, B and D and, independently, any of E, G, J and L optionally being joined together to form one ore more carbocyclic or heterocyclic rings.

In many preferred enamine-functional compounds E, G, J and L are not hydrogen. It is also preferred that not both of A and B are hydrogen. Especially useful enamino-functional compounds contain two or more enamine groups as a result of any of A, B, D, E, G, J and/or L being a radical terminating in one or more enamino groups.

Suitable enamino-functional compounds may be obtained in known manner by reacting a carbonyl compound containing at least one alpha-hydrogen atom, for example an aliphatic, cyclo-aliphatic or araliphatic aldehyde or ketone such as acetaldehyde, propionaldehyde, isobutyraldehyde, caproaldehyde, cyclohexylaldehyde, acetone, methyl ethyl ketone, benzyl methyl ketone, cyclopentanone, cyclohexanone, trimethylcyclohexanone, mixtures of these and the like with a secondary amine, for example a secondary amino-terminated polymer such as a polyether.

Depending on the kind of self skinning product to be obtained with the reaction system of the present invention—i.e. flexible, rigid, semi-rigid or elastomeric integral skin foams —the following parameters should be adjusted within the reaction system:

a) functionality and molecular weight of the isocyanate-reactive components b) isocyanate indices i.e. the ratio of isocyanate equivalents in component A to isocyanate-reactive functional groups in component B of the reaction system.

Thus, for the preparation of rigid integral skin foams, the reaction system according to the present invention will preferably contain isocyanate-reactive compounds as herebelow described of functionality 2–8 and molecular weight less than 1500—preferably polymeric polyols such as polyether or polyester polyols of functionality 2–8 and OH number of 100–600 mg KOH/g.

Reaction systems for the preparation of rigid integral skin foams should provide isocyanate indices ranging from 90 to 1500 and even higher.

For the preparation of flexible, semi-rigid or elastomeric integral skin foams, reaction systems according to the present invention should preferably contain isocyanate-reactive compounds as hereinbefore described of functionality 2–4, preferably 2–3 and molecular weight ranging from 1000 to 10000, preferably 1500 to 10000, most preferably 2000–6000, optionally in admixture with lower molecular weight isocyanate-reactive compounds—the so-called chain extenders—having a molecular weight ranging from about 60 to about 1000.

The low Mw isocyanate reactive compounds used to prepare the composition of the present invention have a Mw of about 60 to 1 000, preferably of about 60 to 450 and most preferably of about 100 to 200. They have an average functionality of 1.8 to 6.

Suitable low molecular weight isocyanate-reactive compounds may be selected from the following classes:
(a) hydroxy compounds
(b) amino compounds
(c) hydroxyamino compounds
(d) imino-functional and/or enamine-containing compounds or mixtures thereof.

Polyols having molecular weights below 1000 include simple non-polymeric diols such as ethylene glycol, propylene glycol, dipropylene glycol, tripropylene glycol and 1,4-butanediol and alkylene oxide adducts of glycerol, sorbitol, sucrose, diamino diphenylmethane, toluene diamine and the like.

Polyamines having molecular weights below 1 000 which may be used include aliphatic, cycloaliphatic or araliphatic polyamines containing two or more primary and/or secondary amino groups and aromatic polyamines.

Aromatic polyamines which are useful in the invention particularly include diamines, especially those having molecular weights from about 100 to about 400, preferably between 122 and 300. Suitable diamines have been fully described in the prior art and include 3,5-diethyl-2,4-toluenediamine, 3,5-diethyl-2,6-toluenediamine, DETDA which is a mixture of about 80% by weight of 3,5-diethyl-2,4-toluenediamine and about 20% by weight of 3,5-diethyl-2,6-toluenediamine, 1,3,5-triethyl-2,6-diaminobenzene, 2,4-diaminotoluene, 2,6-diaminotoluene, 2,4'-diaminophenylmethane, 4,4'-diaminodiphenylmethane, 3,3',5,5'-tetraisopropyl-4,4'-diaminodiphenylmethane and the like and mixtures thereof.

Suitable alkanolamines comprise monoethanolamine, diethanolamine, isopropanolamine and the like.

Suitable low Mw imino-functional and/or enamine-containing compounds have the characteristics of the higher molecular weight imino-functional or enamine-containing compounds described above, except that they have a molecular weight below 1 000.

Examples of preferred low Mw imino-functional compounds include simple aldimines and/or ketimines such as may be obtained by reacting aldehydes, for example formaldehyde, acetaldehyde, propionaldehyde, n-butyraldehyde, isobutyraldehyde, heptaldehyde, alpha-methylvaleraldehyde, beta-methylvaleraldehyde, caproaldehyde, isocaproaldehyde or cyclohexyl aldehyde and mixtures thereof or ketones, for example acetone, methyl ethyl ketone, diethyl ketone, benzyl methyl ketone or cyclo-hexanone and mixtures thereof with primary amines, especially aliphatic diamines. Examples of suitable amines include hexamethylene diamine, methane diamine, isophorone diamine, xylylene diamine, polyoxyalkylene diamines and/or triamines and mixtures of such amines. Primary mono-amines may also be used either alone or together with diamines.

The isocyanate-reactive composition may further contain small amounts of $H_2O$, not exceeding 0.3% by weight of total isocyanate-reactive composition.

Suitable blowing agents which may be used in the reaction system(s) of the present invention ar liquids which vaporise under the influence of the exothermic foam-forming reaction. Such liquids suitably have boiling points not exceeding 100° C., preferably not exceeding 50° C., at atmospheric pressure and include hydrocarbons such as pentane, chlorinated hydrocarbons such as dichloromethane and preferably chlorofluorocarbons or chlorofluorohydro-carbons such as trichlorofluoromethane and dichlorofluoromethane.

Since it is an object of the present invention to partially replace the chlorofluorocarbon blowing agent by $CO_2$, the amounts of such materials in the reaction system will be reduced as compared with the conventional amounts used in integral skin foam applications.

Thus, amounts of physical blowing agents used in the reaction system(s) of the present invention should range between 3% and 15% preferably 3% and 10% by weight of total isocyanate-reactive compositions.

The reaction system of the present invention may further contain other conventional ingredients of such systems such as internal mould release agents, surfactants, fillers (which may be reinforcements), plasticizers, fire retardants, and the like.

Suitable internal mould release agents include, for example, copper stearate, zinc stearate and a dimethyl polysiloxane with organic acid groups which is commercially available as Dow-Corning Q2-7119 from Dow-Corning Corporation. Other organo-polysiloxanes bearing organic hydroxyl groups (instead of acids) can also be used. A specific example of a very effective, hydroxy functional, polysiloxane internal mould release additive is L-412T (available form Goldschmidt AG).

The amount of internal mould release agent used can be from about 0.001 to about 5.0 percent by weight of the total reactants (i.e. total polymer).

Suitable surfactants include, for example, sodium salts of castor oil sulfonates alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Suitable fillers include fibreglass reinforcement fibres particularly those having lengths of from about 1/16 inch (0.16 cm) to about ½ inch (1.27 cm) and milled glass fibres having a length of 1/16 inch (0.16 cm), ⅛ inch (0.32 cm) or ¼ inch (0.64 cm) and the like. Shorter fibres are always preferred for ease of processing when they are incorporated as part of the "A" or "B" component streams.

Other particularly suitable fillers are mica, fumed silica, flake glass, Wollastonite, calcium carbonate, carbon black, barium sulfate and the like.

Organic fillers can also be used such as urea or urethane particles or olefinic unsaturated polymer particles (referred to as polymer polyols).

By suitable choice of ingredients, concentrations and processing conditions of the products of the present invention poly(urethane-carbodiimide) or polyurea-poly(urethane-carbodiimide) articles can be obtained, which may have open and/or closed cells.

The isocyanate-reactive mixture B is produced by combining the ingredients by simple mixing at a temperature between −20° C. to 80° C. until a homogenous blend or a stable dispersion is obtained. The isocyanate-reactive blends should preferably be prepared in an inert, anhydrous atmosphere.

It is another aspect of the present invention to provide a reaction system for use in the preparation of moulded integral skin foams which system comprises:
A) an organic polyisocyanate
B) an isocyanate-reactive composition comprising:
  (i) a catalytically effective amount of a urethane-promoting catalyst and optionally a urea-promoting catalyst,
  (ii) a catalytically effective amount of a carbodiimide-promoting catalyst,
  (iii) an isocyanate-reactive compound; and
C) an inert physical blowing agent.

The present invention further provides an isocyanate-reactive composition for use in the preparation of moulded integral skin foams which composition comprises the hereabove described ingredients (i), (ii) and (iii) and an inert physical blowing agent, in a range of 3% to 15% by weight of isocyanate-reactive composition.

Methods to prepare self skinning parts are well known in the art and have already been described (see e.g. "The ICI Polyurethane Book"—G. Woods—Wiley—1987).

Thus integral skin foams are obtained by introducing into a closed mould the foaming composition and by overpacking the mould.

The injection of the reaction mixture into the mould can be made according to any conventional means or by the reaction injection moulding process—the so-called RIM process.

The surface layer or skin is formed upon contact of the foaming mixture with the relatively cool mould surface, under a pressure greater than atmospheric pressure.

The physical blowing agent may be introduced into the closed mould as a third component or incorporated into the isocyanate component or incorporated into the isocyanate-reactive component.

The invention is illustrated but not limited by the following examples.

COMPARATIVE EXAMPLE 1

A polyurethane integral skin foam was prepared by reacting a glycol modified polyisocyanate composition having an NCO content of about 26%, at an isocyanate index of 100, with a polyol blend consisting of 100 parts by weight (pbw) of a glycerol based propylene oxide-ethylene oxide tipped polyol of Mw about 5300, 8 pbw of monoethylene glycol, 1 pbw of DABCO-catalyst (a 33% solution of triethylene diamine in dipropylene glycol, marketed by Air Products Inc.), 15 parts of Arcton 11 (A-11, a chlorofluorocarbon composition marketed by Imperial Chemical Industries PLC), 0.1 parts of $H_2O$.

The isocyanate composition and the polyol blend were mixed at 20° C. for 10 seconds and the mixture subsequently poured into a mould (dimensions of the aluminium mould were: 20×15×4 cm) at 40° C., after which the mould was closed. After opening of the mould the integral skin foams were inspected for their skin properties.

The resultant foam had the following properties:

| Properties | |
| --- | --- |
| cream time (s) | 13 |
| string time (s) | 46 |
| end of rise time (s) | 63 |
| Free rise density (kg/m³) | 144 |
| Min. demould time (s) | 120 |
| Skin aspect | Good |
| | No afterblow |

COMPARATIVE EXAMPLE 2

A polyurethane integral skin foam was prepared according to Example 1, with the difference that the isocyanate index used was 120.

The resultant foam had the following properties:

| Properties | |
| --- | --- |
| cream time (s) | 12 |
| string time (s) | 43 |
| end of rise time (s) | 64 |
| Free rise density (kg/m³) | 152 |
| Min. demould time (s) | 135 |
| Skin aspect | Good |
| | No afterblow |

EXAMPLE 3

A polyurethane integral skin foam was prepared according to Example 1, with the differences
a) that the amount of A-11 was reduced from 15 pbw to 10 pbw.
b) that 1 pbw of methyl pholene-1-oxide (MPO, a carbodiimide promoting catalyst from Hoechst) was added to the polyol blend.

EXAMPLE 4

A polyurethane integral skin foam was prepared according to Example 3 except that the isocyanate index used was of 120.

The resultant foams had the following properties:

| Properties | Ex 3 | Ex 4 |
| --- | --- | --- |
| cream time (s) | 13 | 13 |
| string time (s) | 42 | 41 |
| end of rise time (s) | 60 | 61 |
| Free rise density (kg/m³) | 174 | 159 |
| Min. demould time (s) | 135 | 135 |
| Skin aspect | Good | Good |
| | No afterblow | No afterblow |

Results show that the use of a carbodiimide promoting catalyst with reduced amounts of A-11 leads to skin and foaming properties which are comparable to those obtained with higher amounts of A-11.

COMPARATIVE EXAMPLE 5

A polyurethane integral skin foam was prepared according to example 3 with the differences that
a) the amount of $H_2O$ used was increased from 0.1 to 0.5 pbw.
b) no MPO catalyst was used.

The resultant foam had the following properties:

| Properties | |
| --- | --- |
| cream time (s) | 13 |
| string time (s) | 49 |
| end of rise time (s) | 72 |
| Free rise density (kg/m³) | 124 |

| Properties | |
|---|---|
| Min. demould time (s) | 120 |
| Skin aspect | BAD SKIN SEVERE AFTERBLOW |

Results show that the use of higher amounts of $H_2O$ as partial replacement for A-11, instead of the use of carbodiimide-promoting catalyst leads to integral skin foams showing bad skin properties and severe afterblow.

EXAMPLE 6

A polyurethane integral skin foam was prepared according to Example 1 with the differences that
a) use was made of a polyisocyanate composition having a higher NCO content, i.e. 28.5% instead of 26% (marketed by Imperial Chemical Industries PLC under the name "Suprasec VM 30").
b) A-11 was replaced by 15 pbw of an alternative inert blowing agent: $CH_2Cl_2$.
c) 1 pbw of MPO was added to the polyol blend
d) an isocyanate index of 120 was used instead of a 100 isocyanate index.

The resultant foam had the following properties:

| Properties | |
|---|---|
| cream time (s) | 13 |
| string time (s) | 41 |
| end of rise time (s) | 56 |
| Free rise density (kg/m$^3$) | 168 |
| Min. demould time (s) | 135 |
| Skin aspect | Good SLIGHT AFTERBLOW |

Results show that the use of a carbodiimide promoting catalyst in the foaming formulation leads to products having good skin properties, even when the conventional A-11 is totally replaced by an alternative physical blowing agent.

We claim:

1. A process for making integral skin foams with a reduced amount of chlorofluorocarbon blowing agent, which comprises reacting in a closed mould:
   A) an organic polyisocyanate
   B) an isocyanate-reactive composition comprising:
   (i) a catalytically effective amount of a urethane-promoting catalyst and optionally a urea-promoting catalyst,
   (ii) a catalytically effective amount of a carbodiimide-promoting catalyst of the formula

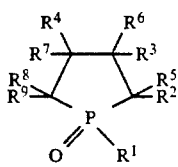

wherein $R^1$ is a substituted or unsubstituted hydrocarbyl group, one of $R^2$ and $R^4$ is Cl or alkyl of 1 to 12 C, while the other forms a double bond with $R^3$, and $R^5$ to $R^9$ are H, Cl or alkyl of 1 to 12 C, and
   (iii) an isocyanate-reactive compound; in the presence of
   C) an inert physical blowing agent with the proviso that the amount of chlorofluorocarbons is between 3 and 10% by weight of total isocyante-reactive composition.

2. A process according to claim 1 wherein the amount of urethane-promoting catalyst is of at most 5% by weight of total isocyanate-reactive composition and wherein the amount of carbodiimide-promoting catalyst is of at most 5% by weight of total isocyanate-reactive composition.

3. A process according to claim 1 wherein the carbodiimide-promoting catalyst is 1-methyl-1-oxo-phospholene, 1-ethyl-1-oxo-phospholene or 1-phenyl-3-methyl-1-oxo-phospholene or mixtures thereof.

4. A process according to claim 1 wherein the isocyanate-reactive composition comprises an isocyanate-reactive compound having a functionality of 2–8 isocyanate-reactive groups and a molecular weight of less than 1500.

5. A process according to claim 1 wherein the isocyanate-reactive composition comprises an isocyanate-reactive compound of functionality 2–4 and a molecular weight of 1500-10000.

6. A process according to claim 5 wherein the isocyanate-reactive composition further comprises an isocyanate-reactive compound of molecular weight 60-1000 selected from the following classes:
   (a) hydroxy compounds
   (b) amino compounds
   (c) hydroxyamino compounds
   (d) imino-functional and/or enamine-containing compounds or mixtures thereof.

7. A process according to claim wherein the amount of physical blowing agent ranges from 3% to 15% by weight of total isocyanate-reactive composition.

8. A process according to claim 1 wherein the isocyanate-reactive composition further comprises at most 0.3% by weight of $H_2O$.

9. A reaction system for use in the preparation of moulded integral skin foams which system comprises:
   A) an organic polyisocyanate
   B) an isocyanate-reactive composition comprising:
   (i) a catalytically effective amount of a urethane-promoting catalyst and optionally a urea-promoting catalyst,
   (ii) a catalytically effective amount of a carbodiimide-promoting catalyst of the formula

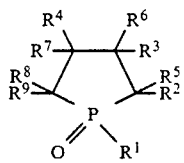

wherein $R^1$ is a substituted or unsubstituted hydrocarbyl group, one of $R^2$ and $R^4$ is Cl or alkyl of 1 to 12 C, while the other forms a double bond with $R^3$, and $R^5$ to $R^9$ are H, Cl or alkyl of 1 to 12 C, and
   (iii) an isocyanate-reactive compound; and
   C) an inert physical blowing agent with the proviso that the amount of chlorofluorocarbons is between 3 and 10% by weight of total isocyanate-reactive composition.

10. An isocyanate-reactive composition for use in the preparation of moulded integral kin foams which system comprises:
(i) a catalytically effective amount of a urethane-promoting catalyst and optionally a urea-promoting catalyst,
(ii) a catalytically effective amount of a carbodiimide-promoting catalyst of the formula

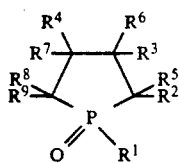

wherein $R^1$ is a substituted or unsubstituted hydrocarbyl group, one of $R^2$ and $R^4$ is Cl or alkyl of 1 to 12 C, while the other forms a double bond with $R^3$, and $R^5$ to $R^9$ are H, Cl or alkyl of 1 to 12 C, and
(iii) an isocyanate-reactive compound; and an inert physical blowing agent in a range of 3% to 15% by weight of isocyanate-reactive composition with the proviso that the amount of chlorofluorocarbon is between 3 and 10% by weight of total isocyanate-reactive composition.

11. A process for making integral skin foams with a reduced amount of chlorofluorocarbon blowing agent, which comprises reacting in a closed mould:
A) an organic polyisocyanate
B) an isocyanate-reactive composition comprising:
(i) a catalytically effective amount of a urethane-promoting catalyst and optionally a urea-promoting catalyst,
(ii) a catalytically effective amount of a carbodiimide-promoting catalyst, and
(iii) an isocyanate-reactive compound; in the presence of
C) an inert physical blowing agent wherein the amount of urethane-promoting catalyst is of at most 5% by weight of total isocyanate-reactive composition and wherein the amount of carbodiimide-promoting catalyst is of at most 5% by weight of total isocyanate-reactive composition.

12. A process according to claim 11 wherein the carbodiimide-promoting catalyst is 1-methyl-1-oxo-phospholene, 1-ethyl-1-oxo-phospholene or 1-phenyl-3-methyl-1- oxo-phospholene or mixtures thereof.

13. A process for making integral skin foams with a reduced amount of chlorofluorocarbon blowing agent, which comprises reacting in a closed mould:
A) an organic polyisocyanate
B) an isocyanate-reactive composition comprising:
(i) a catalytically effective amount of a urethane-promoting catalyst and optionally a urea-promoting catalyst,
(ii) a catalytically effective amount of a carbodiimide-promoting catalyst, and
(iii) an isocyanate-reactive compound; in the presence of
C) an inert physical blowing agent with the proviso that the amount of chlorofluorocarbons is between 3 and 10% by weight of total isocyanate-reactive composition.

* * * * *